United States Patent [19]

Bula

[11] Patent Number: 4,753,044

[45] Date of Patent: Jun. 28, 1988

[54] MACHINE FOR FINISHING CAST OR MACHINED PARTS

[75] Inventor: Bernard Bula, Curtilles, Switzerland

[73] Assignee: Bula & Fils S.A., Henniez, Switzerland

[21] Appl. No.: 51,688

[22] PCT Filed: Sep. 5, 1986

[86] PCT No.: PCT/CH86/00126

§ 371 Date: Apr. 21, 1987

§ 102(e) Date: Apr. 21, 1987

[87] PCT Pub. No.: WO87/01333

PCT Pub. Date: Mar. 12, 1987

[30] Foreign Application Priority Data

Sep. 6, 1985 [CH] Switzerland .......................... 3844/85

[51] Int. Cl.⁴ .............................................. B24B 27/00
[52] U.S. Cl. ........................................ 51/3; 51/165.87
[58] Field of Search ................... 51/3, 5 R, 4, 165.87

[56] References Cited

U.S. PATENT DOCUMENTS

| | | | |
|---|---|---|---|
| 2,754,630 | 7/1956 | Jones | 51/3 |
| 3,624,965 | 12/1971 | Gepfert | 51/3 |
| 3,798,845 | 3/1974 | Stevens | 51/165.87 |
| 3,932,961 | 1/1976 | Pagella | 51/165.87 |
| 4,461,121 | 7/1984 | Motzer et al. | 51/3 |
| 4,653,231 | 3/1987 | Cronkhite et al. | 51/5 R |

FOREIGN PATENT DOCUMENTS

| | | |
|---|---|---|
| 2934066 | 4/1981 | Fed. Rep. of Germany . |
| 2458363 | 1/1981 | France . |
| 0221955 | 5/1985 | German Democratic Rep. . |

OTHER PUBLICATIONS

Article: "Entgraten mit dem Roboter", published in Technische Rundschau, vol. 76, No. 12, Mar. 20, 1984, D. Hilti et al.
Article: "Flexibles Entgraten mit Industrierobotern", published in ZWF, Zeitschrift fur Wirtschaftlich Fertigung, vol. 79, No. 7, D. Hilti et al.
Article: "Robot Vision Adds Flexibility to Finishing", in the publication Tooling and Production, vol. 50, No. 1, E. E. Sprow.
Article: "Montage- und Handhabungstechnik Industrierroboter" in publication Vdi-Zeitschrift, vol. 127, No. 7.
Article: "Ein Reaktionsschnelles Montagerobotor", published in Vdi-Zeitschrift, vol. 127, No. 3.
Article: "Schneidemaschind fur Unkoaren Brenstoff", published in Werkstatt und Betrieb, vol. 105, No. 4, K. H. Korte.

*Primary Examiner*—Harold D. Whitehead
*Attorney, Agent, or Firm*—Sandler & Greenblum

[57] ABSTRACT

The present invention relates to a machine for finishing cast or machined parts comprising a closed enclosure (10) containing at least one finishing unit (14, 16) adapted to be a unit of smoothing of rough edges, of brushing, of rubbing, of polishing or of grinding and a manipulator robot (13) of the hanging type comprising a moveable arm (24) for bringing the parts in contact with the finishing tools. Aspiration elements (30, 31) are associated with each finishing unit. The finishing units are equipped with a compensation apparatus of their wear.

14 Claims, 5 Drawing Sheets

MACHINE FOR FINISHING CAST OR MACHINED PARTS

The present invention relates to a machine for finishing cast or machined parts, particularly smoothing of rough edges, and/or brushing, and/or rubbing, and/or polishing, and/or grinding of these parts, comprising a closed container, at least one finishing unit equipped with a finishing tool of these parts, a programmable manipulator robot adapted to present at least one surface of each rough part to this finishing tool, under at least one predetermined orientation so as to subject it to at least one finishing operation.

The finishing machines currently in common use normally comprise a turning table carrying the elements to be finished and satellites positioned around this table constituting the finishing units. The rough parts are positioned on the turning table by a manual or automatic entry station, are successively presented to the different finishing units then removed from the table by a removal station. The number of parts mounted on the table is equal to the number of satellite finishing units, such that at each step of the turning table, all of the parts carried by the table are simultaneously treated by another finishing unit. After a complete rotation of the turning table, all of the parts are successively passed in front of all of the finishing units.

This apparatus, known for its efficiency and rapidity, is very useful in numerous cases. However, certain parts have complicated shapes, awkward surfaces, edges or shoulders etc., and the known machines do not allow for their finishing in the various satellite finishing units. The moveable supports of the parts, mounted on the turning table, do not have a sufficient mobility, do not allow for the displacement of the parts along a sufficient number of degrees of freedom and cannot present the parts under sufficiently diverse orientations to assure a complete finishing of the parts having irregular shapes, in the course of a single cycle of the machine or by a single take-up of these parts.

Furthermore, the moveable supports of the parts, as well as the control elements of these supports, cams, pneumatic cycles, etc., are constructed as a function of the shape of the parts and the displacements which it is necessary to impose on them to bring them into contact with the finishing units selected to obtain the surface treatment selected. It results that, for each type of part, the user must design a support and appropriate control elements, which considerably raises the cost of treatment of the manufactured parts, particularly those which are formed on relatively small scales.

Consequently, these machines are perfectly useful for the finishing of parts of simple shapes manufactured in large quantities, but are of lesser interest for smaller production runs by virtue precisely of the elevated cost of studying and developing the specific supports adapted to these parts. Furthermore, complicated parts cannot be treated by these known machines.

To overcome these disadvantages, finishing centers have been developed comprising a programmable manipulator robot adapted to present the parts to be machined to a certain number of finishing units. The known finishing centers comprise however a central manipulator robot positioned on a fixed support and the finishing units are themselves mounted on fixed supports positioned around the manipulator robot.

The type of manipulator robot utilized has only a relatively limited number of degrees of freedom and does not make it possible to bring into contact with the said finishing tools objects having particularly complex shapes. Furthermore, a regular surveillance is indispensable to allow an operator to adjust the finishing units in position, as a function of the wear of the finishing tools.

The present invention proposes bringing a remedy to all of the above-mentioned inconveniences by providing a universal finishing machine, adapted to assure in an economical fashion the finishing of parts manufactured in small series, in particular of parts having complex shapes.

To this end, the machine according to the invention is characterized in that the manipulator robot is of the hanging type having at least six axes and is mounted at the top of the closed enclosure, and in that the finishing unit is equipped with an automatic compensation apparatus for the wear of the finishing tool.

According to a preferred embodiment, the automatic compensation apparatus for the wear of the finishing tool comprises a movable support on which is mounted the finishing tool, a wear detector element of the tool, a motor element connected to the moveable support to assure its displacement and means to control the displacement of this moveable support as a function of the wear of the finishing tool.

According to a particularly advantageous embodiment, the detector element of the wear of the finishing tool is a counter adapted to count the number of parts subjected to the finishing operation by means of the said tool and the means to control the displacement of the moveable support are adapted to activate the motor element connected to this support when the number of treated parts has reached a predetermined value.

According to another likewise very advantageous embodiment, the detector element of wear of the finishing tool is adapted to measure the intensity of the feed current of an electric drive motor of this tool and the means to control displacement of the moveable support are adapted to activate the motor element connected to this support when a drop in intensity of this feed current is detected.

The moveable support of the finishing tool comprises preferably at least one slide adapted to displace this tool along a first axis, and the motor element connected to the moveable support preferably comprises an electric motor driving a screw engaged in a nut fixed integrally with a fixed socket connected to the enclosure.

The moveable support of the finishing tool can likewise comprise a column adapted to displace this tool along a second axis perpendicular to the said first axis.

The column adapted to displace the tool along the said second axis is preferably associated with a first electric motor adapted to displace the said tool along the said second axis and a second electric motor adapted to displace the said tool in rotation around this axis.

According to a preferred embodiment, the machine comprises a plurality of finishing units and each finishing unit is associated with an aspiration apparatus of dust. Furthermore, the machine preferably comprises at least one control unit of the state of the surface of the parts after their treatment by the different finishing units. This control unit can be constituted by a spectrometer or any other appropriate apparatus.

In the case where the finishing unit or one of the finishing units of the machine is constituted by a rubbing unit having an abrasive strip, this strip is preferably sustained by two guidance and support rollers of parallel axes, each of which is provided with a coating layer of predetermined hardness. Furthermore, in this case, the rubbing unit can comprise at least one planar or curved support shoe mounted on the rear of the abrasive strip. These measures make it possible to obtain very different support surfaces as a function of the result which one wishes to obtain.

According to another embodiment the machine comprises at least one polishing unit which is preferably equipped with at least one ejection pistol of polishing paste associated with an adjustment element of the quantity of paste ejected at each jet and provided with control means adapted to define the frequency of the jets of paste emitted by this pistol.

In this case, the control means adapted to define the frequency of the jets are preferably incorporated in a treatment center of the data containing the programmer of the programmable manipulator robot and the means to control the moveable supports of the finishing tools.

The present invention will be better understood with reference to the description of one particular embodiment shown by way of non-limiting example, and the annexed drawings in which.

With reference to FIGS. 1-4, the finishing machine illustrated comprises essentially a closed enclosure 10 formed for example by means of a chassis comprising for example two vertical columns 11 connected by a transverse beam 12 which serves to support the programmable manipulator robot 13 mounted at the top of enclosure 10. This manipulator robot is of the hanging type having at least six axes. This number can be extended to nine to increase the flexibility of the system by increasing the dimensions of the space accessible by the manipulator arm of this robot. This will be described in greater detail with reference to FIGS. 4 and 5.

Figure 3:
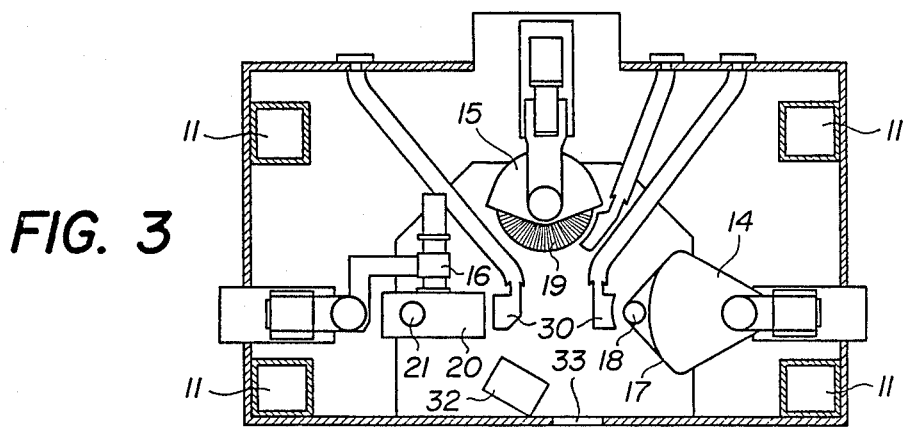
FIG. 3 illustrates a partial view in cross-section along line A—A of FIG. 1.

As is seen more particularly in FIG. 3, the finishing machine described comprises three finishing units 14, 15 and 16 each adapted to perform a different operation on the rough parts to be treated. The finishing unit 14 is, in this case, a rubbing element having a strip provided with emery paper 17 driven in rotation around a guide roller 18 having a vertical axis. The finishing unit 15 is a brushing unit equipped with a brush 19 of vertical axis, of the metallic or abrasive fiber brush type. The finishing unit 16 is, in this case, constituted by a polisher comprising a polishing brush 20 of horizontal axis, preferably associated with an automatic distributor 21 of polish paste.

The number and the nature of the different finishing units can be varied at will as a function of the operations to which one must subject a part such that its surface reaches the desired state. The rubbing units by means of emery paper, of brushing and/or polishing can be replaced by other different units such as for example a unit for smoothing rough edges comprising a rotational cutting tool, a grinding unit, etc. One can likewise provide for equipping the entire machine with different polishing units provided with polish brushes respectively associated with distributors of polish paste which is finer and finer making it possible to obtain, by successive exposure, the required surface finish for the part considered.

Figure 1:
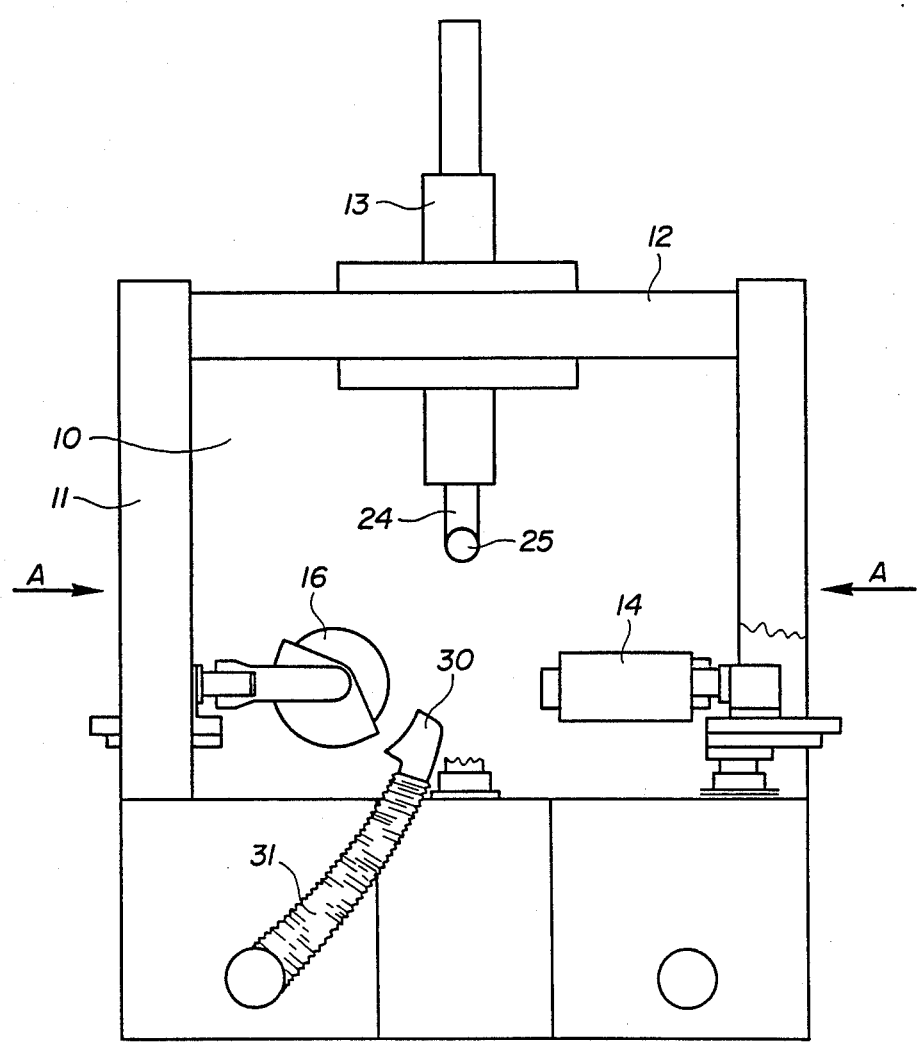
FIG. 1 illustrates a front schematic view in elevation of the finishing machine according to the invention.
Figure 2:
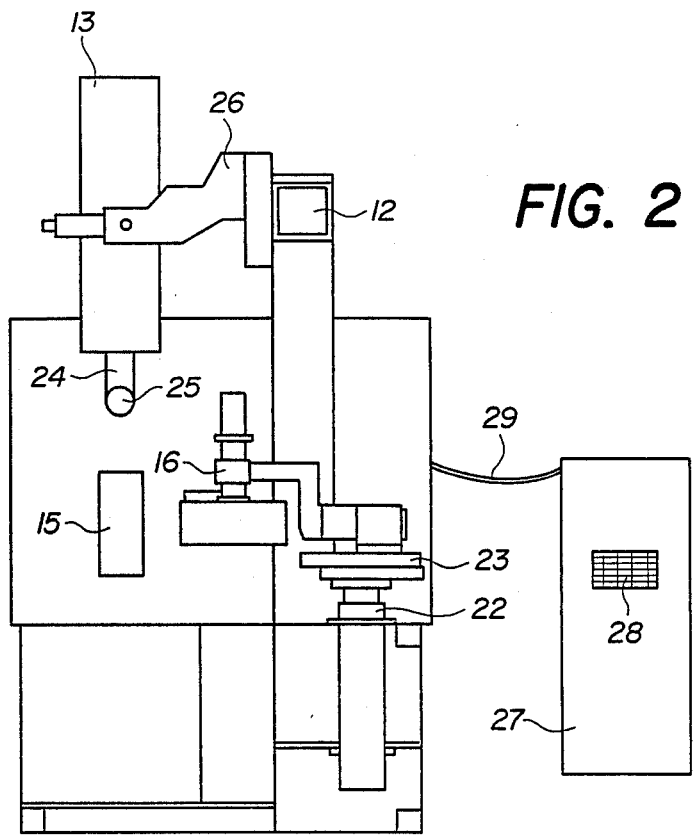
FIG. 2 illustrates a lateral elevational schematic view of the finishing machine illustrated by FIG. 2.

With reference to FIG. 2, each finishing unit is carried by a moveable support composed of a telescopic column 22, for example of the screw type, which supports a slide 23 adapted to be displaced in a horizontal plane. According to one particular embodiment, the slide is pivotable with respect to the axis of the column. According to another embodiment, the support of the finishing unit is rotational with respect to the slide. In the two cases, the finishing unit can be adjusted in height, along a vertical axis, in angular position in a horizontal plane and in translation along a horizontal axis. In other terms, each finishing unit is adjustable in position as a function of the part to be treated.

According to an alternative embodiment which will be described below, each finishing unit is mounted on a moveable support controlled by a wear detector of the finishing tool.

The manipulator robot 13 is at the top of enclosure 10 in such a manner that manipulator arm 24, ending in a gripping element 25 of the squeezing mandril type, hydraulic pincer, pneumatic or mechanical, electromagnetic, etc. can bring the parts to be treated in contact with the tools of the different finishing units. To this end, the robot, of the hanging type, is preferably mounted in a central fashion with respect to the finishing units positioned around the access zone of the manipulator arm 24. This robot is journalled along two perpendicular axes on a bracket 26 carried by the transverse beam 12. The displacements of the manipulator arm are programmed by means of a programmable control unit, positioned in a closet 27, equipped for example with a programming console 28 and connected to the robot by a linkage cable 29.

To each finishing unit is associated an aspiration apparatus (see FIG. 1) comprising an aspiration head 30 connected, by a flexible conduit 31, to an aspiration apparatus not shown. As the finishing units are positioned in the closed enclosure and as this enclosure is equipped with means adapted to aspirate the dust and the wastes, the atmosphere within the enclosure and, all the more so, the surrounding atmosphere are maintained perfectly clean. As a result the finishing machine described can be placed without risk in any shop, even in a laboratory where a clean environment constitutes a fundamental requirement.

To assure a control of the state of the surface obtained at the end of the finishing operation, the machine described can comprise, as is shown for example in FIG. 3, a control element 32. This control element can be a spectrometer. It can be adapted to furnish a signal to the manipulator robot such that it automatically selects the finished parts responding to the requirements with respect to the state of the surface and separates those which do not meet these requirements.

To allow for the take-up of the raw parts brought by a transfer element (not shown) or positioned in an appropriate storage element, the enclosure preferably comprises a window 33 through which the manipulator arm can pass.

The finishing machine described above has multiple advantages and makes it possible to finish in a careful fashion parts of a great complexity of shapes such as, for example, turbine blades which are impossible to treat in the course of a single cycle by a traditional machine, or prothesis elements such as knees, hips, artificial hands or surgical or dental instruments.

The robot, whose manipulator arm can displace along an elevated number (for example 6-9) degrees of freedom, makes it possible to present the surfaces to be treated under all possible orientations and allows for the displacements of these elements along any trajectories, which can be defined by a programming performed by the user himself.

Various parameters such as the support pressure of the parts against the active surfaces of the finishing units can be controlled. The action time of each unit can be individually controlled. One can include in the program annexed commands such as the pulverization of the lubricants or polish paste, replacement of worn out or defective tools. To this end, a wear detector can be integrated into each finishing unit to free an appropriate signal adapted to set in motion a replacement operation of the worn out tool. A magazine of replacement parts can be mounted on the interior or the exterior of the enclosure, in the access zone of the manipulator arm.

Figure 4:
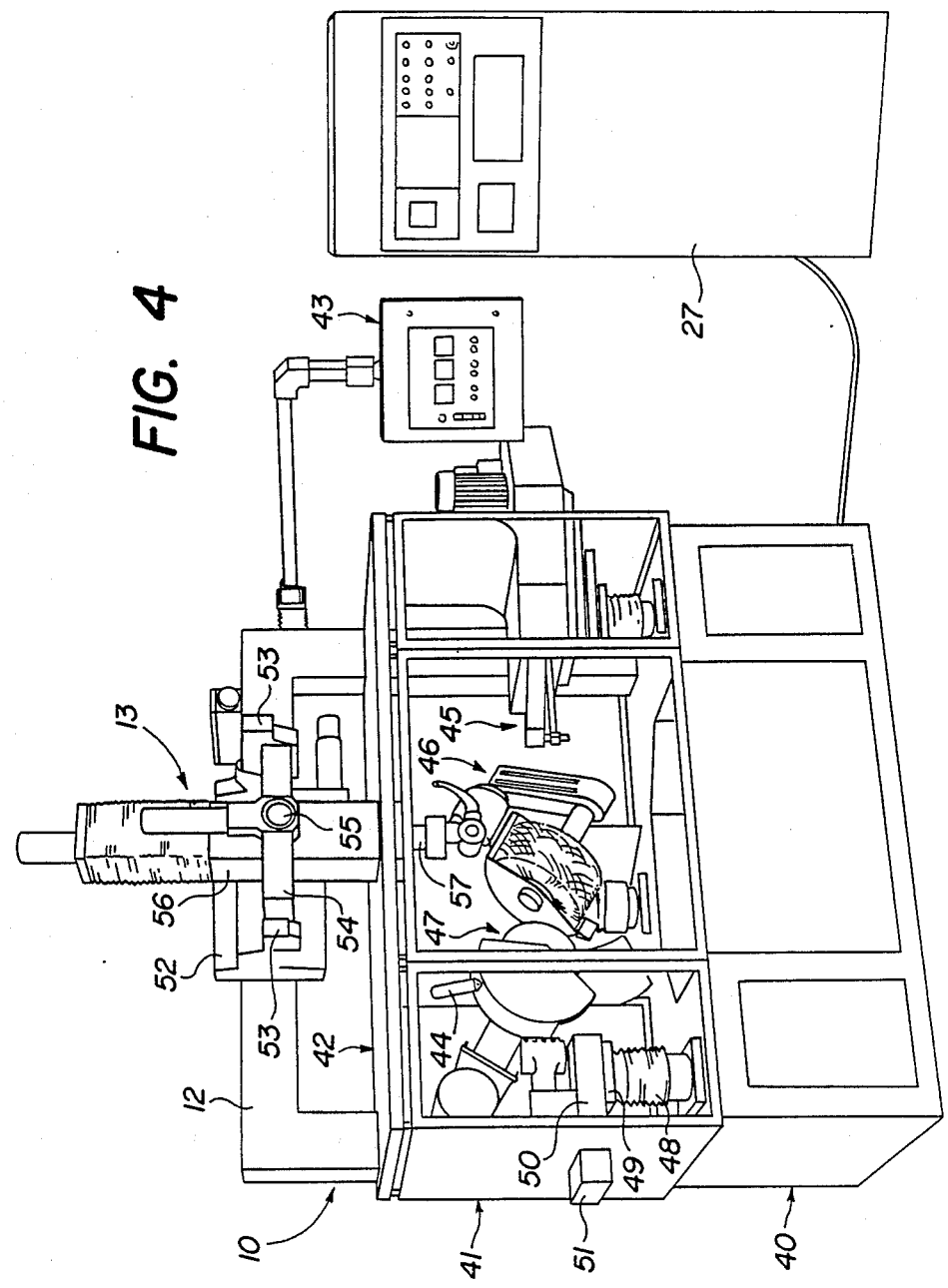
FIG. 4 illustrates a perspective view of one particular embodiment of the finishing machine according to the invention.
Figure 5:
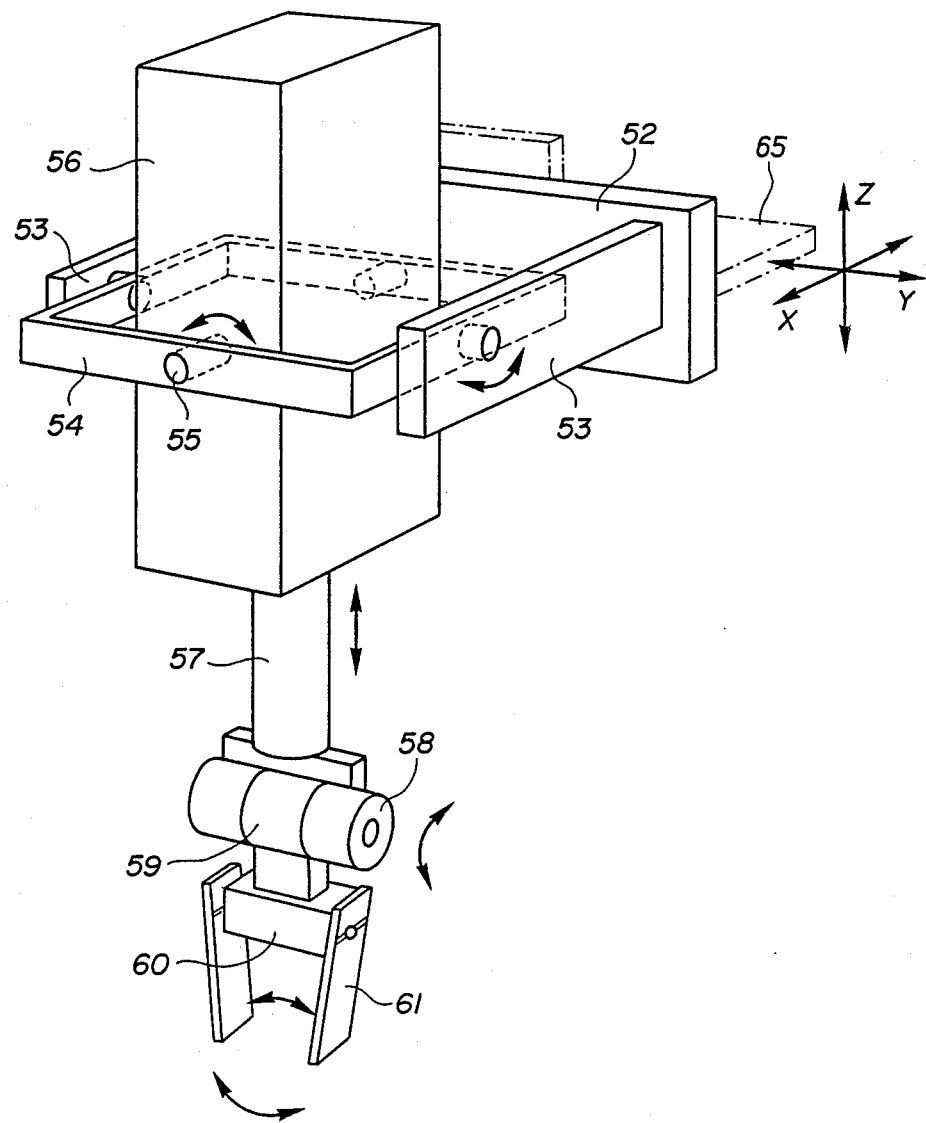
FIG. 5 illustrates a schematic in perspective of the manipulator robot mounted at the top of the enclosure.

As is seen more particularly in FIG. 4, enclosure 10 is composed in fact of a lower cupboard 40 containing particularly the electric feed and various mechanical elements, an upper portion 41 which can likewise be closed particularly on the front surface by means of glass panels and a roof 42, partially open in its central portion to allow for the passage of the programmable hanging robot 13. A control box 43 is associated with enclosure 10 and assures the control of the finishing units. The cupboard 27 contains the central treatment unit of the data allowing for the programming of the manipulator robot 13 and the transmission of various signals to assure in particular the compensation functions of the wear of certain tools such as the brushes and the feed functions of the polishing brushes with the polishing paste. This latter function is assured by means of pistols 44 controlled pneumatically at regular intervals.

In the example illustrated, enclosure 10 contains a rubbing unit 45, a brushing unit 46 and a polishing unit 47. Each of these three units is preferably mounted on a moveable support comprising a telescopic column 48, a fixed support 49 and slide 50 which can be displaced along a predetermined axis by means of a motor 51. The mechanical elements making it possible to assure these different displacements will be described in greater detail with reference to FIGS. 7A and 7B.

The hanging robot 13 preferably comprises six displacement axes, but this number can be brought to nine to increase the dimensions of the zone accessible by the manipulator arm. It is composed essentially of a support 52 fixed rigidly to the transverse beam 12 or mounted on a moveable platform 65 along three orthogonal axes X, Y, Z, such as shown schematically by FIG. 5, this support 52 carrying two parallel arms 53 on which is journalled a cradle 54 carrying an axis 55 on which is journalled the body 56 of robot 13. A shaft 57 is partially lodged on the interior of the body 56 and carries at its free end a cylindrical element 58 provided with a rotational cheek 59 to which is attached support 60 of two pincers 61 controlled by an electromagnet and adapted to open or close to take up a part to be treated. It is understood that the pincers can be replaced by different elements adapted to take up the machined or molded parts which must be brought into contact with the finishing tools.

Figure 6:
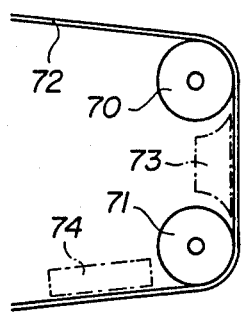
FIG. 6 illustrates a partial schematic view of a rubbing unit which can be mounted within the enclosure.

FIG. 6 illustrates the useful end or the head of a rubbing unit comprising two rollers 70 and 71 on which a rubbing strip 72 turns constituted for example of emery paper. These two cylindrical rollers preferably comprise surface coatings of different hardnesses which makes it possible to position different support surfaces and as a consequence to modify the type of treatment that one makes the parts undergo brought into contact with strip 72 at the level of one or the other of rollers 70 and 71. As the figure shows, the support shoes 73 and 74 can be provided along the strip to enlarge the range of possible treatments on the same rubbing head.

Figure 7B:
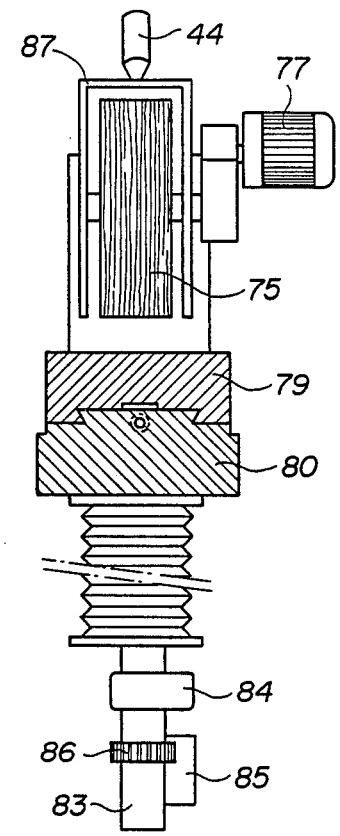
FIG. 7B illustrates a front elevational view of the rubbing unit illustrated by FIG. 7A.
Figure 7A:
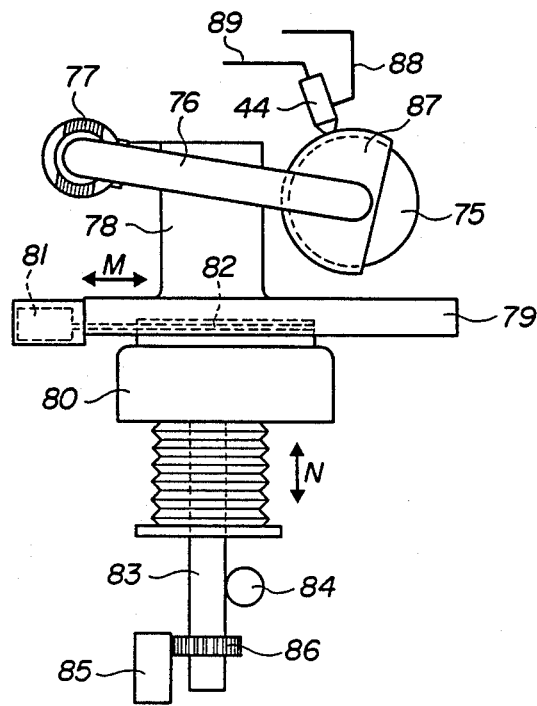
FIG. 7A illustrates a lateral elevational view of a polishing unit which can be mounted within the enclosure of the machine according to the invention.

FIGS. 7A and 7B illustrate a polishing unit comprising a polishing brush 75 mounted at the end of an arm 76 likewise carrying a drive motor 77 coupled to brush 75 by means of a belt (not shown). This assembly is mounted on a support 78 integral with a slide 79 moveable in the direction of the double arrow M with respect to a socket 80 by virtue of a mechanism comprising an electric motor 81 and a screw 82. The socket 80 is mounted on a column 83 adapted to be displaced in the direction of the double arrow N by means of a motor 84 or in rotation around the axis of this column by means of an electric motor 85 coupled to a toothed wheel 86. The is shown more particularly in FIG. 7B, the slide 79 is of the type known as an eagle's tail. This displacement mechanism of the moveable support of the finishing units is particularly useful to equip the machine with an automatic compensation apparatus of the wear of the finishing tools.

An ejector pistol 44 of polish paste is mounted on the protector cover 87 of the brush 75. It is fed with polish paste through a conduit 88 and with compressed air by means of a conduit 89.

Figure 8:
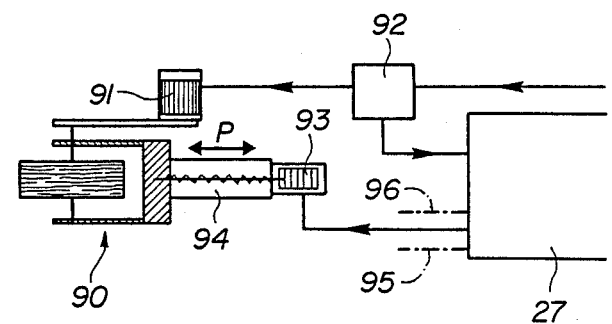
FIG. 8 illustrates a view illustrating the principle of the compensation of the wear of the finishing tools put into operation on the machine according to the invention.

As the schematic of FIG. 8 shows, a finishing unit 90, which can for example be a brushing or polishing unit whose brush is driven by a drive motor 91, is associated with an apparatus for detecting the wear of the brush. This detection apparatus comprises for example a circuit 92 for measuring the intensity of the feed current of the motor 91. This measurement circuit 92 is coupled to the central treatment unit of the data contained in the programming closet 27. This central treatment unit of the data is connected to a motor 93 which controls the displacement of the slide 94 in the direction of the double arrow P. Two other outlets 95 and 96 can be provided in the case where the compensation of the wear likewise imposes the displacement in height or in rotation of a column such as the column 83 of the preceding figures supporting the fixed socket of the finishing unit.

This wear compensation apparatus can likewise operate according to another principle which is that of counting the number of parts treated by the finishing unit. In this case, a counter registers the number of parts treated by the finishing unit and the central treatment unit of the data transmits to the finishing unit a control signal which serves to displace its moveable support as soon as the number counted by the counter reaches a predetermined value.

So that the surface velocity of the brushes or other finishing tools remains constant regardless of the wear of this tool, the circuit 92 preferably comprises a circuit which makes it possible to increase the drive velocity of the tool as its diameter decreases.

By virtue of the displacement of the tool and the increase in its surface velocity at the same time that its diameter diminishes by virtue of its wear, one assures a uniform treatment to all of the parts by exerting in particular regular pressure constraints on the treated surfaces of all of the parts of a single series. This advantage is particularly important because it makes it possible to eliminate all manual intervention normally necessary to compensate for the wear of the finishing tools.

The finishing machine described can be mounted on a manufacturing line, to constitute an independent work station or a station connected to a more complex installation adapted to perform any one industrial process. By the combination of the access paths, a plurality of similar machines can be positioned in series or in parallel, depending on the operations to be performed on the parts to be treated.

In practice, the finishing machine described can be adapted to a substantial number of needs, such that its universality is one of its fundamental properties.

I claim:

1. Finishing machine of molded or machined parts, particularly smoothing of rough edges, and/or brushing, and/or rubbing, and/or polishing, and/or grinding of these parts, comprising a closed enclosure, at least one finishing unit equipped with a finishing tool of these parts, a programmable manipulator robot adapted to present at least one surface of each raw part to this finishing tool, in at least one predetermined orientation so as to subject it to at least one finishing operation, characterized in that the manipulator robot (13) is of the hanging type having at least six axes and is mounted at the top of the closed enclosure (10), and in that the finishing unit is equipped with an automatic compensation apparatus for the wear of the finishing tool.

2. Machine according to claim 1, characterized in that the automatic compensation apparatus for the wear of the finishing tool comprises a moveable support on which is mounted the finishing tool, a detector element of the wear of this tool, a motor element (93) connected to the moveable support to assure its displacement and means to control the displacement of this moveable support as a function of the wear of the finishing tool.

3. Machine according to claim 2, characterized in that the detector element of the wear of the finishing tool is a counter adapted to record the number of parts subjected to the finishing operation by means of the said tool, and in that the means to control the displacement of the moveable support are adapted to activate the motor element (93) connected to this support, when the number of treated parts has reached a predetermined number.

4. Machine according to claim 2, characterized in that the detector element (92) of the wear of the finishing tool is adapted to measure the intensity of the feed current of an electric motor (91) for driving the tool, and in that the means for controlling the displacement of the moveable support are adapted to activate the motor element (93) connected to this support when a drop in the intensity of this feed current is detected.

5. Machine according to claim 2, characterized in that the moveable support of the finishing tool comprises at least one slide (94) adapted to displace this tool along a first axis and in that the motor element connected to the moveable support comprises an electric motor driving a screw engaged in a nut integrally fixed to a fixed socket (80) connected to the enclosure.

6. Machine according to claim 2, characterized in that the moveable support of the finishing tool comprises a column (83) adapted to displace this tool along a second axis perpendicular to the said first axis.

7. Machine according to claim 6, characterized in that the column adapted to displace the tool along the second axis is associated with a first electric motor (84) adapted to displace the said tool along the said second axis and a second electric motor (85) adapted to displace the said tool in rotation around this axis.

8. Machine according to claim 1, comprising a plurality of finishing units, characterized in that each finishing unit is associated with a dust aspiration apparatus.

9. Machine according to claim 8, characterized in that it comprises at least one control unit (15) of the state of the surface of the parts after their treatment by the different finishing units.

10. Machine according to claim 9, characterized in that the control unit is a spectrometer.

11. Machine according to claim 1, comprising at least one rubbing unit having an abrasive strip characterized in that this unit comprises two guide rollers and parallel support axes, each of these rollers being provided with a coating of predetermined hardness.

12. Machine according to claim 11, characterized in that the rubbing unit comprises at least one rigid support shoe which is planar or curved, mounted at the rear of the abrasive strip.

13. Machine according to claim 1, comprising at least one polishing unit, characterized in that this polishing unit is equipped with at least one ejection pistol (44) of the polish paste comprising an element for adjusting the quantity of paste ejected at each jet and provided with control means adapted to define the frequency of the jets of paste emitted by the pistol.

14. Machine according to claim 13, characterized in that the control means adapted to define the frequency of the jets are incorporated in a central treatment unit of the data containing the programmer of the programmable manipulator robot (13) and the means to control the displacements of the moveable supports of the finishing tools.

* * * * *